United States Patent [19]

Riding

[11] Patent Number: 5,010,912
[45] Date of Patent: Apr. 30, 1991

[54] WATER TREATING DEVICE, OR SIMILAR ARTICLE

[76] Inventor: Richard D. Riding, 16631 Canyon View, Riverside, Calif. 92504

[21] Appl. No.: 493,629

[22] Filed: Mar. 15, 1990

[51] Int. Cl.⁵ .......................... B05B 7/14; B01D 11/02
[52] U.S. Cl. ..................................... 137/268; 422/282
[58] Field of Search ............................ 137/268, 205.5; 422/282; 239/310

[56] References Cited

U.S. PATENT DOCUMENTS

| | | | |
|---|---|---|---|
| 255,532 | 3/1882 | Pindar | 422/282 X |
| 373,867 | 11/1887 | Trowbridge | 422/282 X |
| 618,349 | 1/1899 | Heany | 422/282 X |
| 759,750 | 5/1904 | Rosenthal | 137/205.5 X |
| 846,100 | 3/1907 | Estep | 137/268 X |
| 1,855,323 | 4/1932 | Sirch . | |
| 1,917,704 | 7/1933 | Dresher . | |
| 2,023,552 | 12/1935 | Savage . | |
| 2,461,067 | 2/1949 | Lewis | 422/282 |
| 2,602,699 | 7/1952 | Otto | 137/268 X |
| 3,021,862 | 2/1962 | Miller . | |
| 3,118,462 | 1/1964 | Pannutti | 137/268 |
| 3,753,444 | 8/1973 | Winton | 137/268 |
| 3,776,274 | 12/1973 | Riley . | |
| 3,974,847 | 8/1976 | Hodges . | |
| 4,250,910 | 2/1981 | King | 137/268 |

*Primary Examiner*—Alan Cohan
*Attorney, Agent, or Firm*—John H. Crowe

[57] ABSTRACT

A container for solid water soluble fertilizer pellets supported in an upright position by a short vertical water supply pipe through an upper integral inlet pipe and a lower integral outlet pipe. The inlet pipe has a formation designed to direct a portion of a downward stream of water in the supply pipe into the container to augment the force of gravity and cause the diverted water to flow over pellets in the container. The outlet pipe is located at the lower end of the container to direct the water, now with dissolved fertilizer in it, back into the supply stream. A formation on the outlet pipe coacts with the supply stream to aid in circulating water through the container and over the pellets.

3 Claims, 1 Drawing Sheet

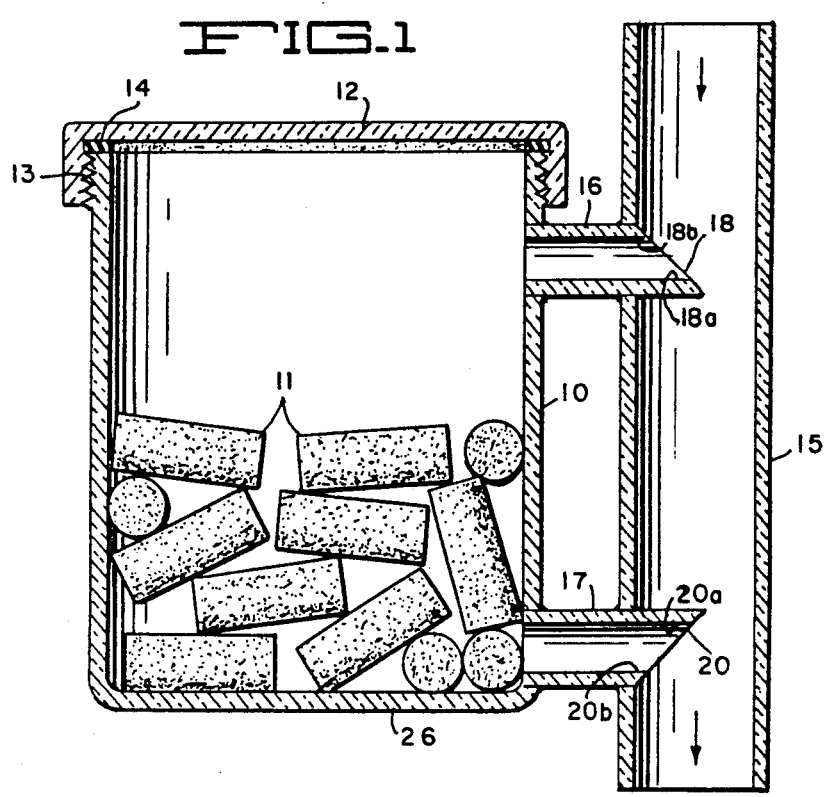
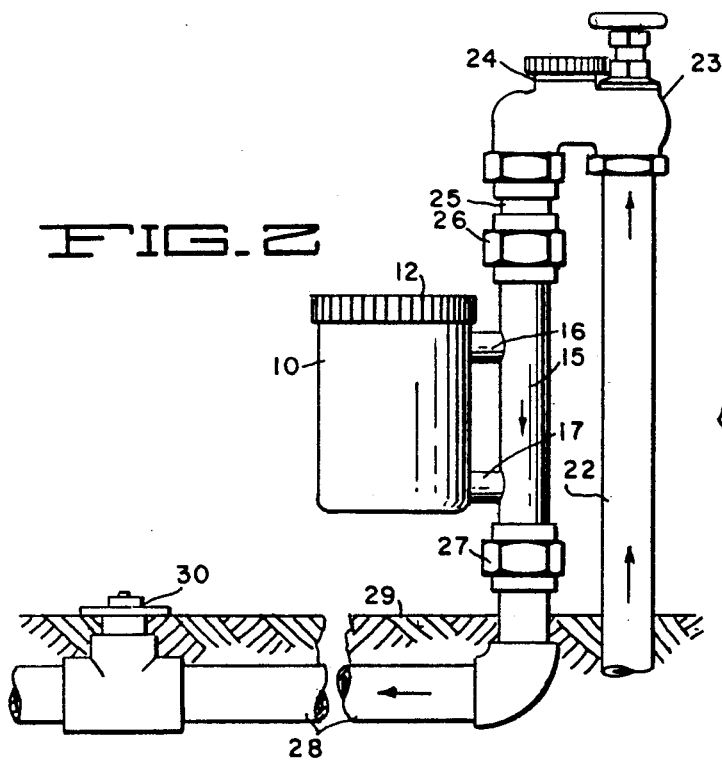
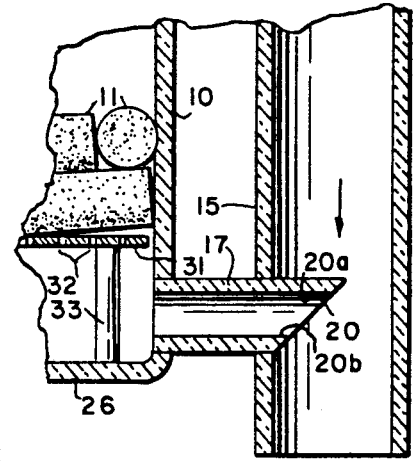

WATER TREATING DEVICE, OR SIMILAR ARTICLE

BACKGROUND OF THE INVENTION

1. Field of the Invention

This invention relates to a device for introducing chemicals, such as chemical fertilizers, insecticides, herbicides and the like, into an irrigation system and has particular reference to such a device for dissolving solid water-soluble chemicals in pellet or cartridge form and metering the dissolved material into the system.

2. Description of the Prior Art

Means for introducing fertilizers into irrigation systems or devices for watering lawns, gardens, trees, etc. are known. For the most part, these expedients, at least those of which I am aware, are designed to feed liquid fertilizers into streams of irrigation water and they are generally complicated, expensive or inadequate for extensive use. Some require dismantling each time they are used or charged with fresh fertilizer solutions.

SUMMARY OF THE INVENTION

A principal object of the present invention is to provide an improved device for dissolving solid water-soluble chemicals, such as chemical fertilizers, and for metering the dissolved chemicals into an irrigation system.

Another object of the invention is to provide a device of the foregoing type which is extremely simple, compact, economical to manufacture, and reliable in operation.

Another object is to provide a device of the above type which can be used with water-soluble pellets of various sizes and shapes.

A further object is to provide a device of the above type devoid of any small orifices or openings which partially dissolved chemicals may tend to clog or form deposits in which could cause malfunctioning of the unit.

According to the invention, an extremely simple, inexpensive and reliable device is provided to form chemical fertilizer and the like solutions from solid water-soluble agglomerates or pellets and meter the solutions into an irrigation system. The device comprises a container for pellets of varying sizes and shapes which is supported in an upright position, when installed for use, by a vertical supply pipe to which it is attached by means of inlet and outlet pipes. The inlet pipe is located above the outlet pipe and has a formation extending into the supply pipe which diverts a portion of a stream of water flowing downwardly in the supply pipe into the container and over the pellets. Water containing dissolved chemicals from the pellets flows under the action of gravity, and the inlet flow of water from the inlet pipe, through the lower outlet pipe and back into the supply pipe.

The outlet pipe also has a formation extending into the supply pipe which helps to cause the supply stream flowing past the outlet pipe to assist in withdrawing the treated water from the container.

BRIEF DESCRIPTION OF THE DRAWING

The manner in which the above and other objects of the present invention are accomplished will be readily understood by reference to the following specification when read in conjunction with the accompanying drawing, wherein:

FIG. 1 is a longitudinal sectional view taken through a chemical dispensing device embodying a preferred form of my invention.

FIG. 2 is a schematic view of part of an irrigation system incorporating the invention.

FIG. 3 is a fragmentary sectional view similar to FIG. 1 but showing a modified form of the invention.

DESCRIPTION OF THE PREFERRED EMBODIMENTS

Referring to FIG. 1 and 2, the chemical dispensing device comprises an upright cylindrical container 10 adapted to receive a plurality of solid water-soluble fertilizer or the like pellets 11. A lid 12 is removably attached to the upper end of the container through a screw-threaded connection 13, to permit replenishment of the pellets, and an elastomeric sealing ring 14 is provided between the lid and the top of the container to form a watertight seal. The container 10 is supported in an upright position by a short vertical supply pipe 15 to which it is attached by means of an upper inlet pipe 16 and a lower outlet pipe 17 integral therewith. The supply pipe 15 serves to convey a downwardly flowing stream of water therethrough as will be described later.

Inlet pipe 16 extends into the supply pipe 15 to a point midway therein in the form of a slanted or rearwardly and upwardly extending terminus 18. A lower portion 18a of the terminus 18 extends farther into the supply stream than its upper portion, shown at 18b, thereby inducing a downflowing stream of water to develop a slight lateral flow through the inlet pipe 16 and into the container 10, where it flows down over the pellets 11, aided by the force of gravity.

The pellets 11, which may be of any suitable size or shape, are slowly dissolved in the water flowing therearound and the resulting solution flows out through the outlet pipe 17 and into supply pipe 15. Outlet pipe 17 extends into supply pipe 15 and is formed with a rearwardly and downwardly sloping formation 20 having an upper portion 20a extending further into the supply stream than a lower portion 20b. Thus, as the major portion of the water stream in supply pipe 15 passes the outlet pipe 17, it develops a slight minus pressure to augment the forces causing the water to flow over and around the pellets 11 and out through the outlet pipe.

Although some of the pellets 11, when materially reduced in size through partial solution in the water passing thereover, may flow out through the outlet pipe 17, it has been found that these generally are completely dissolved before they pass through the main portion of the irrigation system.

It will be noted that the outlet pipe 17 is located slightly above the bottom 26 of container 10. Thus, whenever the supply of water to supply pipe 15 is cut off, as by means of a valve such as shown at 23, the water in container 10 will drain out through the outlet pipe 17, leaving any partially dissolved pellets 11 intact and ready for future use when the water supply is resumed.

FIG. 2 illustrates the device of FIG. 1 installed in a typical irrigation system comprising a pressurized water main 22, manually operable shutoff valve 23 and a backflow preventing or antisyphon valve 24. The latter is of conventional construction and is effective to prevent the backflow of water into water main 22 when pressure in the main is reduced or cut off. The outlet 25 of valve 24 is connected to the top of the aforementioned supply pipe 15 through a readily removable union or pipe connector 26 of conventional design. The lower end of the supply pipe is likewise connected, through a second pipe connector 27, to an irrigation line 28 extending slightly below the ground surface 29 and leading to one or more water sprinkling devices such as that shown at 30. Container 10 may be readily replenished with a supply of pellets by merely removing the lid 12, loading the pellets into the container, and then replacing the lid.

FIG. 3 illustrates a modified form of the invention in which like parts to those shown in FIG. 1 and 2 are identified by like reference numerals. Here, a circular plate 31 having a plurality of perforations 32 spaced throughout is supported above the bottom of the container 10 by depending legs, one of which is shown at 33. This perforated plate tends to prevent pellets which have been reduced in size by partial solution from passing through the outlet pipe 17 and into the water stream in supply pipe 15.

From the foregoing it will be evident that I have provided a simple, inexpensive but highly reliable water treating device particularly adapted for insertion into the water supply line of an irrigation system. Once installed, the device need not be removed even in those cases where the water is not to be treated. Due to its integral design, except for a removable lid, there are no parts to wear out and the device will take considerable abuse without damage. Although this device has been herein illustrate and described with particular emphasis on its use in the feeding of soluble fertilizers or the like into a water irrigation system, it should be understood that any device having the structural character and functional capability taught and claimed herein, regardless of its specific function, falls within the scope of my claimed invention. Such a device, for example, could be one capable of use in any system requiring the feeding of a solid material in dissolved form into a stream of solvent for that material

I claim:

1. A device particularly adapted for treating water comprising:

a supply pipe adapted to be supported in a vertical position and convey a downward stream of water therethrough;

a container adapted to receive soluble solid agglomerates and having a closure lid;

an inlet pipe extending between said supply pipe and said container in the upper portion of said container; and an outlet pipe extending between said container and said supply pipe from near the lower end of said container;

the inlet and outlet pipes serving to support said container in an upright position for use, said inlet pipe having a part extending into said supply pipe with a lower portion and an upper portion, the lower portion extending farther into the supply pipe than the upper portion whereby to direct water from said supply pipe into said container and over said solids, and said outlet pipe being located near the lower end 15 of said container to enable most of the water in said container to drain out of it when water flow into said supply pipe is discontinued.

2. A device as defined in claim 1 wherein said outlet pipe extends into said supply pipe and has a lower portion and an upper portion, the upper portion extending farther into said supply pipe than the lower portion whereby to direct solution from said outlet pipe into said supply pipe.

3. A device as defined in claim 1 including a perforated member extending across the interior of said container for supporting said solid agglomerates and means for supporting said member above the level of said outlet pipe.

* * * * *

UNITED STATES PATENT AND TRADEMARK OFFICE
CERTIFICATE OF CORRECTION

PATENT NO. : 5,010,912
DATED : April 30, 1991
INVENTOR(S) : RICHARD D. RIDING

It is certified that error appears in the above-identified patent and that said Letters Patent is hereby corrected as shown below:

Column 1, line 66, change "obJects" to --objects--. Column 3, line 32, "illustrate" should be --illustrated--. Column 4, line 2, add a period after "material"; and line 25, cancel "15".

Signed and Sealed this

Ninth Day of March, 1993

Attest:

*Attesting Officer*

STEPHEN G. KUNIN

*Acting Commissioner of Patents and Trademarks*